Sept. 15, 1942.　　A. HOLLANDER ET AL　　2,295,579
LIQUID SEAL
Filed July 30, 1940　　2 Sheets-Sheet 1

ALADAR HOLLANDER
VAINO A. HOOVER
CHARLES H. NAZRO
INVENTORS

BY Lyon & Lyon
ATTORNEYS

Sept. 15, 1942.   A. HOLLANDER ET AL   2,295,579
LIQUID SEAL
Filed July 30, 1940   2 Sheets-Sheet 2
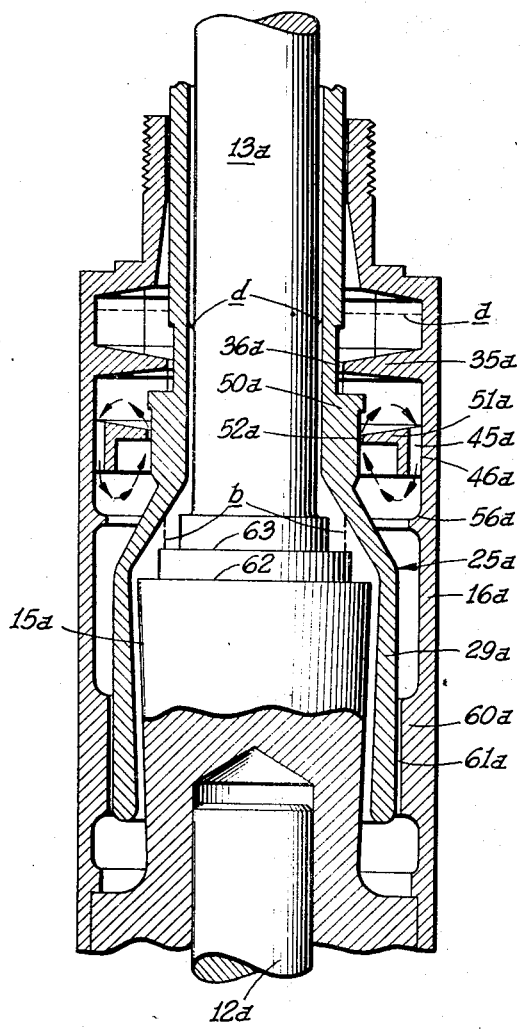
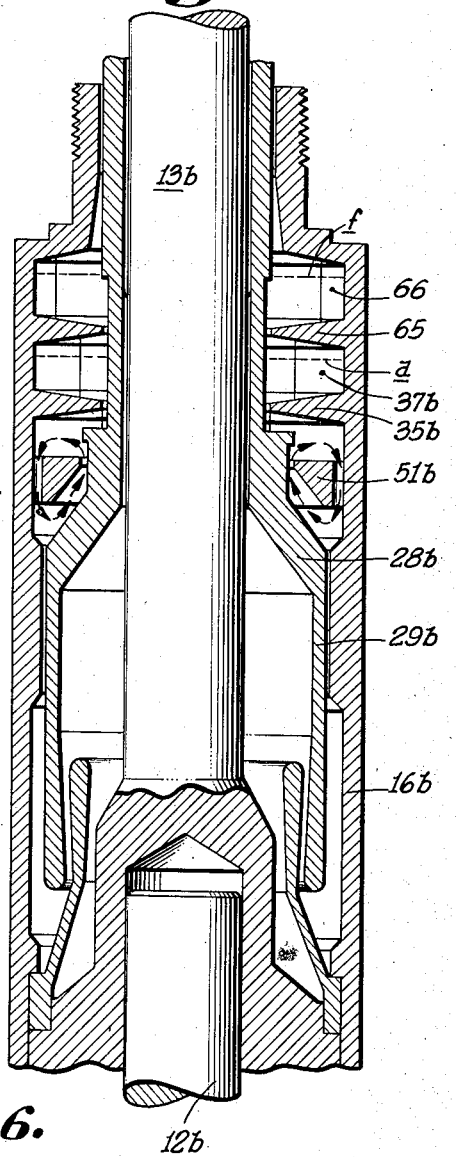
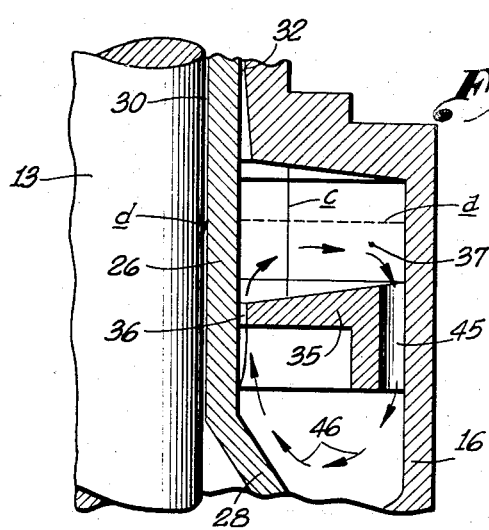
ALADAR HOLLANDER
VAINO A. HOOVER
CHARLES H. NAZRO
INVENTORS
BY Lyon & Lyon
ATTORNEYS Patented Sept. 15, 1942

2,295,579

UNITED STATES PATENT OFFICE 2,295,579

LIQUID SEAL

Aladar Hollander, Vaino A. Hoover, and Charles H. Nazro, Los Angeles, Calif., assignors to Byron Jackson Co., Huntington Park, Calif., a corporation of Delaware Application July 30, 1940, Serial No. 348,458

15 Claims. (Cl. 286—9)

This invention relates generally to a sealing device, and more particularly to a liquid seal for sealing the juncture of a rotating shaft and a housing through a wall of which the shaft projects.

For certain applications, such as a submersible device embodying a housing immersed in an external liquid and containing an internal liquid and a rotating shaft extending through a wall of the housing, a liquid seal has proven to be most effective over an extended period of time in preventing admixture of the two liquids at the juncture of the shaft and housing. Particularly in submersible electric motors of the type in which the motor housing is filled with a dielectric liquid, it is of utmost importance that even minute quantities of the external liquid be prevented from entering the housing, especially if the external liquid is water or other liquid having an injurious effect on the motor windings.

As an aid in understanding the objects and purpose of the instant invention, a brief preliminary discussion of the characteristics of a liquid seal is believed to be in order. It should be borne in mind, however, that the statements made in this preliminary discussion are of a general nature, and will be amplified and possibly modified to some extent during the subsequent discussion of a preferred construction embodying the instant invention.

The most satisfactory type of liquid seal which has been heretofore developed embodies a cup or shell secured to the shaft to rotate therewith and containing a body of sealing liquid such as mercury or other liquid of high specific gravity, and a stationary baffle secured to the housing in concentric relation to the shaft and having a depending annular skirt extending into the body of sealing liquid. In such a seal the contact of the sealing liquid with the rotating surfaces on the shaft and cup induces rotation of the sealing liquid, and the centrifugal force developed in the rotating sealing liquid tends to prevent migration of the lighter weight external and internal liquids through the body of sealing liquid. However, at high rotative speed such as that attained by two-pole or large four-pole induction motors, certain adverse factors develop which, if not counteracted, tend to cause migration of minute particles of the external liquid through the sealing liquid and thus decrease the effectiveness of the seal. When the shaft is stationary and the pressures on opposite sides of the seal are balanced, the surface of the sealing liquid on the inner side of the baffle, between the baffle and the shaft, assumes the same level as that on the outer side of the baffle. During rotation, however, centrifugal force tends to throw the sealing liquid outwardly away from the shaft, and, if this force is unopposed, the surface of the sealing liquid assumes a vertically inclined position at a distance from the shaft depending on various factors, such as the linear velocity and area of the rotating surfaces contacting the sealing liquid, and the relative area of stationary surfaces contacting the sealing liquid and exerting a frictional braking effect thereon. The annular space thus formed between the shaft and the surface of the sealing liquid becomes filled with external liquid, thus decreasing the thickness of and the pressure prevailing in the body of sealing liquid between the external liquid and the baffle, and promoting the tendency to migration of external liquid to the outer side of the baffle and thence into the internal liquid.

A principal object of this invention is to prevent the outward displacement of the sealing liquid during rotation, by the development of a force acting in opposition to the centrifugal force tending to cause the displacement. In a preferred embodiment of the invention, the opposing force is developed within the body of sealing liquid by utilizing the difference in pressures prevailing in bodies of sealing liquid rotating at different speeds, to set up a secondary, or return, circulation within the sealing liquid. It has been ascertained from extensive tests that a pumping action can be established in this manner which equals or exceeds the action of the centrifugal force tending to outwardly displace the sealing liquid, and which can be directed in opposition to the latter to nullify it and thus prevent outward displacement of the sealing liquid.

A further object of the invention is to confine to a region remote from the shaft, the secondary circulation of sealing liquid which produces the above-mentioned pumping action, in order to avoid disturbing the stability of the sealing liquid adjacent the shaft.

A still further object of the invention is to confine the secondary circulation of sealing liquid to a region spaced from the surface of contact of the sealing liquid and the internal liquid, in order to avoid intermixing of the two liquids and the resultant formation of an emulsion in the event the internal liquid is an oil, as is often the case.

The manner in which the foregoing and other more specific objects are attained will be apparent from the following detailed description of one embodiment of the invention and several alternative forms thereof, reference being had to the accompanying drawings wherein:

Fig. 4 is a sectional view of a modification of the device of Figs. 1 and 2;

Fig. 5 is a sectional view of a still further modification; and

Fig. 6 is a fragmentary view of a still further modification.

Figure 1:
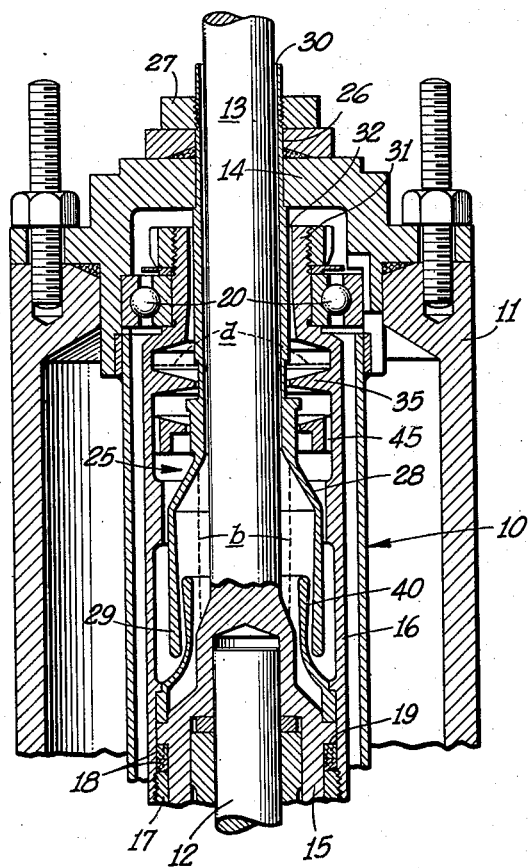
Fig. 1 is a central longitudinal sectional view of one embodiment of the invention.
Figure 2:
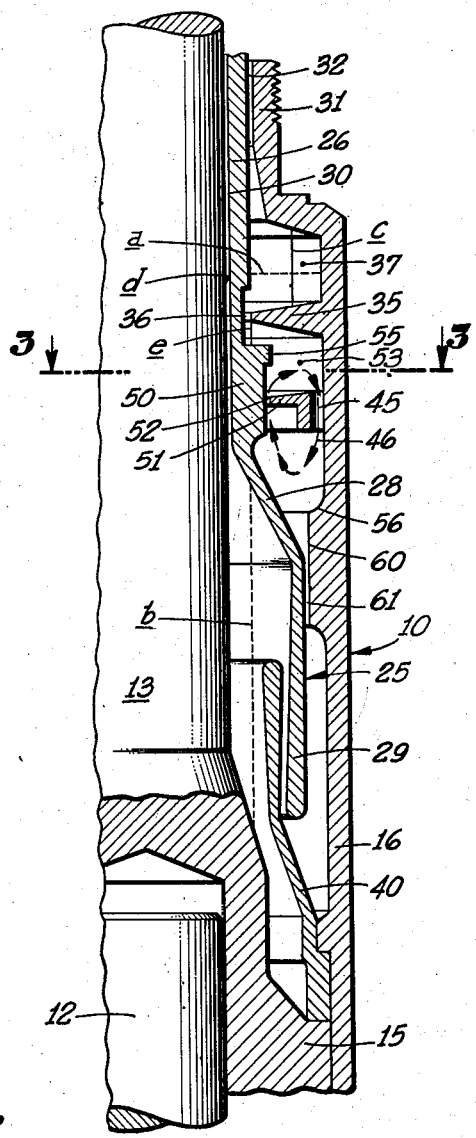
Fig. 2 is an enlarged fragmentary view of the sealing device of Fig. 1.
Figure 3:
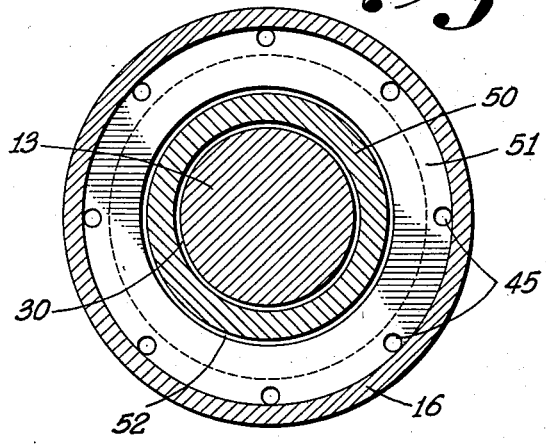
Fig. 3 is a transverse section on line 3—3 of Fig. 2.

Referring to Figs. 1 to 3, we have shown a sealing device, generally designated 10, incorporated in a submersible structure comprising a shell or housing, the upper end of which is shown at 11. For purpose of illustration, the housing may be considered as a submersible motor housing adapted to be submerged in a surrounding liquid and being filled with a dielectric liquid such as transil oil. The upper end of the rotor shaft of the motor, indicated at 12, is suitably coupled to a separate shaft section 13, which for convenience will be termed a seal shaft, and which extends through a central opening in the end wall 14 of the housing. The sealing device 10 seals the juncture of the shaft 13 and the end wall 14.

The lower extremity of the seal shaft is enlarged at 15 and is telescoped over the upper extremity of the rotor shaft 12. An annular sleeve member 16 is rigidly clamped at its lower end to the enlarged portion of the shaft 13 in concentric relation to the shaft, as by a threaded nut 17. Suitable packing 18 is interposed between the inner end of the nut and a clamping shoulder 19 on the shaft enlargement to form a fluid-tight joint. In order to maintain the upper end of the sleeve 16 concentric with the shaft 13, we have shown it as journaled in the end plate 14 on a ball bearing 20. The sleeve 16 is thus mounted on the shaft 13 to rotate therewith about the axis of the shaft, and forms with the shaft an annular receptacle for sealing liquid such as mercury.

A stationary baffle, generally designated 25, extends downwardly into the receptacle through the open upper end thereof. The baffle comprises an upper cylindrical neck portion 26 rigidly secured at its upper end in fluid-tight relation to the end plate 14, as by a nut 27, and a downwardly and outwardly flared portion 28, and a depending skirt portion 29 extending nearly to the bottom of the receptacle. The neck portion 26 extends in closely spaced concentric relation to the shaft, providing a narrow annular channel 30 communicating at its upper end with the external liquid in which the housing 11 is immersed, and communicating at its lower end with the portion of the mercury receptacle lying between the baffle and the shaft. The outer wall of the neck portion 26 also has close running clearance with the reduced upper end 31 of the sleeve 16, providing a narrow annular channel 32 communicating at its upper end with the interior of the housing 11 and communicating at its lower end with the portion of the mercury receptacle on the outer side of the baffle. The receptacle is normally filled with mercury up to approximately the level indicated by the dotted line $a$, and thus in order for any external liquid to pass from the inner side of the baffle to the outer side thereof and into the interior of the housing it must travel downwardly in the channel 30, through the body of mercury between the shaft and baffle, and around the lower end of the baffle. Once it has passed beneath the lower end of the baffle, however, it will readily move upwardly through the mercury on the outer side of the baffle and become mixed with the internal liquid in the housing 11.

During rotation of the shaft 13 and the shell 16, the mercury is caused to rotate with those elements, and, because of the high specific gravity of the mercury, sufficient centrifugal force is developed at high speed to throw the mercury outwardly and to cause it to be displaced from the region of the shaft. It is for this reason that the upper end of the sleeve is reduced at 31 to a relatively small internal diameter, to prevent the mercury from being forced upwardly out of the receptacle. In order to further limit the upward displacement of the mercury during rotation, a lip 35 projects inwardly from the sleeve 16 adjacent its upper end to form a narrow overflow channel 36 (Fig. 2) adjacent the outer wall of the baffle neck 26. The portion of the receptacle between the lip 35 and the reduced upper end 31 constitutes an overflow chamber 37.

In the form of the invention shown in Figs. 1 and 2, the shaft 13 is of uniform diameter from the upper end of the baffle 25 down to a point adjacent the lower end of the baffle. It has been found that during rotation, even though the mercury is apparently in contact with at least a portion of the shaft, a capillary film of external liquid may move downwardly along the shaft to the bottom of the receptacle, where there is a possibility of its being thrown radially outwardly beneath the lower end of the baffle by the pumping action of the bottom wall of the receptacle. In order to return any such particles of external liquid to the region of the shaft and to prevent their migrating to the outer side of the baffle, an annular thimble 40 is secured in fluid-tight relation to the base and extends upwardly within the baffle in telescopic relation thereto. Thus any particles of external liquid which may migrate downwardly along the shaft to the base of the receptacle are deflected upwardly along the inner wall of the thimble 40 to a point well above the lower end of the baffle, and as they reach the upper end of the thimble they will be swept off by the mercury and, because of their lesser density, will be forced inwardly to the shaft by the heavier mercury.

As stated previously, during rotation of the shaft the free surface of the mercury is tilted vertically. At high linear velocities, such as those developed in 2-pole or large 4-pole induction motors, the inner surface of the mercury will be substantially in the form of a vertical cylinder. Assuming that the receptacle has been filled with mercury up to the level indicated at $a$, and that the only restraint imposed on the mercury is that offered by the sleeve 16 and the lip 35, the position of the inner surface of the mercury during high speed rotation will be determined by the inner wall of the lip 35, and, on the inner side of the baffle, it will assume approximately the position indicated by the dotted line $b$ (Fig. 2. Such a condition is highly undesirable for several reasons, the most important of which are as follows:

(1) An annular space of substantial width is formed between the surface of the mercury and the shaft, which space becomes filled with external liquid. A relatively large body of external liquid is thus admitted to the receptacle to a point adjacent the lower end of the baffle;

(2) The thickness of the body of mercury lying between this body of external liquid and the baffle is greatly reduced, thus enhancing the possibility of migration of particles of external liquid through the mercury and around the lower end of the baffle;

(3) This "draw-down" of the mercury occurs at the beginning of each period of rotation of the shaft, and is very likely to draw in sediment with the external liquid. When rotation ceases and the mercury assumes its normal stationary level, any sediment drawn in with the external liquid may not be expelled by the mercury but may cling to the shaft and contaminate the mercury on subsequent rotation; and (4) Any mercury displaced into the overflow chamber above the lip 35 is ineffective in maintaining the seal, inasmuch as it has been sidetracked out of the path followed by external or internal liquid when migrating through the seal.

We have discovered, however, that it is possible to prevent this "draw-down" of the mercury and its attendant ill effects, by developing a force within the body of mercury acting in opposition to the centrifugal force which causes the drawdown. During the initial starting period and before a condition of equilibrium has been established, the centrifugal force developed in the mercury manifests itself on the outer side of the baffle as an upwardly directed pressure tending to force mercury upwardly through the overflow passage 36 and into the overflow chamber until sufficient mercury has been displaced to cause the inner surface thereof to substantially coincide with the line b of Fig. 2. Consequently, if an equal pressure were exerted downwardly in the space between the outer wall of the baffle and the sleeve 16, the displacement of the mercury over the lip 35 would be prevented and the line b would coincide with the wall of the shaft. We have found that a downward pressure of equal or even greater magnitude than the upward pressure resulting from centrifugal force can be developed by establishing a secondary circulation of the mercury from an upper zone in which the mercury rotates at approximately the same angular velocity as the shaft to a lower zone in which the mercury rotates at a substantially slower speed. Inasmuch as centrifugal force is a direct function of angular velocity, the pressure developed at a given radial distance in a body of liquid rotating at a given angular velocity will exceed the pressure developed at the same radial distance in a separate body of the same liquid rotating at a slower speed.

Referring to Fig. 6 of the drawings, wherein this phase of the invention is illustrated in a simpler form than in the other embodiments, it will be observed that the body of mercury in the overflow chamber 37 is bounded on three sides by surfaces on the rotating sleeve 16, and that the inner surface of the mercury, designated by the line c, is in contact with the internal liquid. Because of the three rotating walls and the absence of any stationary wall contacting this body of mercury to exert a frictional drag thereon, it will rotate at a speed approaching that of the sleeve 16. On the other hand, the body of mercury immediately below the lip 35 rotates at a much slower speed than the sleeve 16 because of the decreased area of rotating walls contacting the mercury and inducing rotation thereof, and because of the relatively large area of the stationary baffle 26 contacting it and retarding rotation. Consequently, at any given radial distance from the axis of the shaft, the mercury in the overflow chamber is under substantially greater pressure than the mercury in the space immediately below the lip 35, and, by establishing communication between the relatively high pressure zone in the overflow chamber and the zone below the lip 35, this relatively high pressure can be exerted downwardly in opposition to the upwardly directed pressure tending to displace the mercury from the inner side of the baffle.

To this end, a plurality of vertically extending ports 45 are provided at circumferentially spaced points in the outer margin of the lip 35 adjacent the sleeve 16, through which mercury is forced downwardly from the overflow chamber into the space below the lip by the greater pressure prevailing in the overflow chamber. By providing a sufficient number of ports 45 of suitable size, the rate of discharge of mercury downwardly through the ports can be made to equal the rate at which mercury is forced through the overflow channel and into the overflow chamber during the initial starting period, and consequently the displacement of mercury from the inner side of the baffle around the lower end thereof and into the outer compartment between the baffle and the sleeve 16 can be avoided altogether. The downward pressure exerted on the body of mercury in the space below the lip 35 by the secondary circulation indicated by the arrows 46 in Fig. 6 may be of sufficient magnitude to equal or exceed the upward pressure developed by centrifugal force, so that, when equilibrium is established, the level of the mercury on the inner side of the baffle may be maintained at the point indicated at d, or may even be forced to a higher level in the annular channel 30 between the neck of the baffle and the shaft. It will be understood that the circulation around the lip as indicated by the arrows 46 continues after equilibrium is established, and maintains the downward pressure on the mercury in the space on the outer side of the baffle. The mercury normally filling the space between the baffle and the shaft when the latter is stationary is thus maintained in this space during rotation, and the above-mentioned "draw-down" and its attendant disadvantages are eliminated.

Looked at in another way, the pressure in the outer part of chamber 37 is so much greater than the pressure at the inner part, by virtue of the centrifugal force resulting from the relatively high velocity of the mercury in the chamber 37, that by providing the ports 45, and making them of sufficient size and number, mercury can be returned from chamber 37 through the ports 45 as fast as it escapes through the passage 36. It follows, obviously, that if mercury is returned from the chamber as fast as it enters the chamber, there can be no total change in the volume of mercury below the lip 35 and hence no "draw-down."

Referring again to Fig. 6, it will be observed that if the seal is filled with mercury to the level indicated at a, and if during rotation the mercury is expelled from the overflow chamber through the ports 45 as rapidly as it flows into the chamber through the overflow passage 36, the surface of the mercury in the overflow chamber during rotation will shift from the horizontal position indicated at a to the vertical position indicated at c. The annular space between the surface c and the outer wall of the baffle 26 is filled with internal liquid entering the seal through the channel 32, and it will be evident that the mercury flowing upwardly through the overflow channel 36 must contact the internal liquid. This is undesirable, since irrespective of the nature of the internal liquid, inter-mixing of the two liquids will occur, and if the internal liquid is an oil, the finely divided particles of mercury issuing from the overflow channel 36 in spray form become coated with a film of oil and form a mercury oil emulsion.

A mercury-oil emulsion is one consisting of particles of mercury surrounded with oil, as distinct from an oil-mercury emulsion which consists of particles of oil surrounded by mercury. The mercury-oil emulsion is objectionable because it is extremely difficult to break down. On the other hand, an oil-mercury emulsion, with the oil constituting the internal phase, is comparatively unstable and may be broken down by high-speed rotation, the lighter oil particles being squeezed out of the mercury by the pressure developed by centrifugal force.

There is a tendency to form an oil-mercury emulsion at all of the oil-mercury contact surfaces, but, as stated above, this type of emulsion is readily broken up by rotation and is not troublesome.

However, it has been found that a mercury-oil emulsion is not only very difficult to break up but has entirely different characteristics from mercury alone and its formation in the overflow chamber 37 changes the position at which liquid-contact surfaces above and below the lip 35 are normally established. The formation of mercury oil emulsion in chamber 37 has a cumulative effect, and when once started it progresses at a gradually increasing rate, inasmuch as the presence of emulsion in the overflow chamber creates in itself a condition favoring the formation of additional emulsion at an increased rate. Furthermore, such an emulsion eventually migrates upwardly through the annular channel 32 and escapes into the interior of the housing 11, and, because of its low dielectric property, it breaks down the insulation between exposed electrical connections in the housing.

In order to avoid contact between the stream of mercury overflowing from channel 36 and the internal liquid in the overflow chamber, and to thereby prevent the formation of a mercury oil emulsion, the construction illustrated in Fig. 6 has been modified as shown in Figs. 1 and 2. It will be observed, by referring particularly to Fig. 2, that the neck 26 of the baffle is enlarged at 50 below the lip 35, and that an auxiliary lip 51 is provided on the sleeve 16 below the lip 35 and in the region of the enlarged section 50. In this manner an auxiliary overflow channel 52 is provided between the lip 51 and the enlarged baffle section 50, and it will be noted that the channel 52 is disposed radially outwardly of the main overflow channel 36. In this embodiment, the secondary circulation ports 45 are formed in the outer margin of the auxiliary lip 51, as indicated in Figs. 2 and 3, and thus the circulation of mercury is upwardly through the channel 52 and into the chamber 53 between the lips 35 and 51, and thence downwardly through the ports 45 and into the space below the lip 51. If the seal is filled with mercury to the level indicated at $a$, the surface of contact between the mercury and the internal liquid in the chamber 53 will be located at the inner edge of the lip 35, as indicated by the vertical line $e$ in Fig. 2. Hence, by reason of the fact that the auxiliary overflow channel 52 is spaced radially outwardly of the line $e$, the secondary circulation indicated by the arrows 46 occurs wholly within the body of mercury and out of contact with the internal liquid, and the formation of a mercury-oil emulsion is avoided.

It will be observed that, as previously mentioned, in Fig. 6 the body of mercury above the lip 35 does not contact any stationary surface and that consequently its rotative speed will closely approach that of the sleeve 16. In Figs. 1 and 2, however, the isolation of the path of secondary circulation away from contact with the internal liquid has made it necessary that a portion of the inner surface of the mercury in the chamber 53 be in contact with the stationary baffle. However, in view of the relatively small area of contact with the stationary baffle in comparison with the area of contact on three sides with the rotating sleeve, the speed of rotation of the mercury in the chamber 53 of Fig. 2 is not appreciably lower than that of the mercury in the chamber 37 of Fig. 6. In any event, it has been found that with the construction illustrated in Figs. 1 and 2, sufficient downward pressure can be developed to equal or exceed the upward pressure due to centrifugal force tending to displace mercury from the inner side of the baffle.

In order to divert the upwardly directed stream of mercury flowing through the overflow channel 52 away from the contact surface $e$, and to thereby avoid turbulence at that point, an overhanging shoulder 55 is formed at the upper extremity of the enlarged baffle section 50. The mercury stream is thus diverted in an outward direction toward the circulation ports 45.

In a similar manner, a deflecting shoulder 56 or other equivalent means is preferably provided in the path of the streams of mercury issuing from the lower ends of the ports 45, to divert the streams inwardly toward the baffle. Even with the deflecting surface 56, it has been found that the violence of the secondary circulation around the lip 51 may be such as to create disturbance in the body of mercury at as remote a zone as the region of the shaft 13. This should be avoided if possible, inasmuch as any disturbance of the mercury at the surface of the shaft enhances the possibility of particles of external liquid being swept off the shaft from the previously mentioned capillary film of external liquid on the shaft, and carried outwardly by secondary currents beneath the lower end of the baffle and into the outer compartment of the seal. In order to confine the secondary movements of the mercury resulting from the pumping action around the lip 51, while at the same time enabling the pressure developed thereby to be exerted against the mercury on the inner side of the baffle, a restricted throttling passage 61 is formed between the zone immediately below the lip 51 and the body of mercury adjacent the shaft. The throttling passage is preferably located immediately below the circulation path indicated by the arrows 46, although it will be understood that the same effect would be produced if it were located adjacent the lower end of the baffle.

In the form of the invention shown in Figs. 1 and 2, the throttling passage 61 is formed by extending the wall of the sleeve 16 straight downwardly from the inner extremity of the deflecting surface 56, as indicated at 60, in closely spaced relationship to the outer wall of the baffle. In this manner the secondary movements of the mercury are to a major extent confined to the space immediately below the lip 51.

Figure 4 illustrates a modified form of seal embodying the novel features incorporated in the embodiment shown in Figs. 1 and 2. In Fig. 4 the shaft 13a is enlarged at 15a throughout substantially the entire length of the skirt 29a of the baffle, the enlargement 15a terminating at its upper end in a stepped series of shoulders 62 and 63. The baffle 25a is enlarged at 50a in a manner similar to Figs. 1 and 2, and an auxiliary lip 51a is formed on the sleeve 16a below the main lip 35a to provide an auxiliary overflow channel 52a spaced radially outwardly of the main overflow channel 36a around the inner edge of the main lip 35a. Circulation ports 45a similar to the ports 45 of Fig. 2 extend through the auxiliary lip 51a to permit the establishment of a secondary circulation indicated by the arrows 46a, thus producing a pressure opposing the pressure produced by centrifugal force tending to displace mercury from the inner side of the baffle. Thus, instead of the surface of contact of the mercury and the external liquid being located at the dotted line b, as would be the case if the circulation ports 45a were omitted, the surface of contact is maintained during rotation at approximately the level indicated at d, at approximately the same or a higher elevation than the static level a.

In this form of the invention, the inner wall of the sleeve 16a is extended inwardly at 60a adjacent the lower portion of the baffle skirt 29a, to form a restricted throttling passage 61a between the sleeve and the baffle and thus protect the body of mercury on the inner side of the baffle from the disturbance created by the pumping action around the lip 52a. A separate deflecting shoulder 56a is formed below the ports 45a by an inward projection on the wall of the sleeve, to deflect the streams of mercury issuing from the ports laterally inwardly toward the baffle, and thus shorten the vertical dimension of the path of secondary circulation in the space between the baffle and the sleeve and above the throttling passage 61a.

The seal shown in Fig. 4 functions in the same manner as that shown in Figs. 1 and 2, and, except for the above-noted structural modifications, is substantially identical with the previously described form.

In Fig. 5 there is shown a still further modification of the seal shown in Figs. 1 and 2, this form of the invention, however, embodying only relatively minor structural modification. In this embodiment the volume of the space immediately below the auxiliary lip 51b is considerably reduced by extending the cylindrical outer wall of the baffle skirt 29b upwardly into closer proximity to the lip 51b than is the case in Fig. 2, and by eliminating the undercut recess on the lower side of the lip 51b, thus forming a downwardly and outwardly inclined inner wall on the lip extending substantially parallel to the flared portion 28b of the baffle.

An added safety precaution against the loss of mercury from the seal into the interior of the enclosing housing is provided in Fig. 5 by the addition of a second lip 65 similar to the main lip 35b, and a second overflow chamber 66 above the lip 65. In this manner a wider tolerance is permitted in the amount of mercury placed in the seal, since the seal will function in the same manner regardless of whether it is filled with mercury to a point just above the main lips 35b or up to a level indicated by the dotted line f. It is considered preferable, however, to only partially fill the overflow chamber 37b, such as to the level indicated at a.

The form shown in Fig. 5 is otherwise substantially identical with that shown in Figs. 1 and 2, and therefore further description thereof is deemed unnecessary.

From the foregoing description of several alternative forms of the invention it will be apparent that we have provided an improved seal in which displacement of the mercury away from the shaft during rotation is eliminated, thereby overcoming a defect inherent in seals as heretofore constructed. As a result of this improvement, much higher rotative speeds are attainable before migration of external liquid around the lower end of the baffle begins to take place. By the elimination of "draw-down," the accumulation in the seal of sediment from the external liquid is avoided, and the entire body of mercury lying below the overflow lip when the seal is stationary, is maintained below the lip during rotation and is therefore effective in maintaining the seal.

The elimination of the formation of a mercury-oil emulsion in the overflow chamber is also of paramount importance if the seal is to be used in conjunction with submersible electrical apparatus, because of the inevitable escape of the emulsion into the oil-filled housing and its eventual deposit on exposed electrical connections with disastrous results.

Although we have described in detail several specific embodiments of the invention, it will be understood that the invention is not limited to the specific constructions illustrated, but is of the full scope of the appended claims.

We claim:

1. A seal for sealing the juncture of a rotatable member and a stationary member, comprising: cup means secured to said rotatable member to rotate therewith and providing therewith an annular receptacle for sealing liquid; a baffle secured to said stationary member and extending downwardly around said rotatable member and into said sealing liquid, said baffle dividing said receptacle into inner and outer compartments separated from each other at their upper ends and communicating with each other below the lower edge of said baffle; said cup means having a wall extending inwardly into close proximity to said baffle adjacent the upper end of said cup means and providing above said wall a chamber communicating with said outer compartment at the inner periphery of said wall; and means forming a passageway extending through said wall and connecting the outer portion of said chamber with said outer compartment.

2. In a seal for sealing the juncture of a rotatable shaft and a stationary member, the combination of: cup means secured to said shaft to rotate therewith and providing therewith an annular receptacle for sealing liquid; a baffle secured to said stationary member and extending downwardly around said shaft and below the surface of said sealing liquid, said baffle dividing said surface into a primary surface on the inner side of said baffle and a secondary surface on the outer side of said baffle, and said primary surface tending to move downwardly during rotation of said sealing liquid with said shaft and cup means; and pumping means opposing downward movement of said primary surface, said pumping means comprising vertically spaced walls on said cup means adjacent the upper end thereof and defining a chamber containing sealing liquid rotating at higher velocity than the sealing liquid in the portion of said receptacle below said walls, and walls defining passage means extending through the lowermost of said walls for continuously circulating sealing liquid from the outer portion of said chamber into the portion of said receptacle below said walls.

3. A seal for sealing the juncture of a rotating shaft and a stationary member, comprising; cup means secured to said shaft to rotate therewith and providing a receptacle for sealing liquid; a baffle secured to said stationary member and extending downwardly around said shaft and into said sealing liquid and dividing said receptacle into inner and outer compartments; said cup means including walls in the upper portion of the cup means dividing said outer compartment into a main chamber and an auxiliary chamber thereabove, the rotating walls of said auxiliary chamber contacting a relatively small body of sealing liquid over a relatively large area and rotating said body of sealing liquid at high velocity to develop pressure therein greater than the pressure of the sealing liquid in said main chamber; passage means connecting the outer portion of said auxiliary chamber with said main chamber for discharging sealing liquid from said auxiliary chamber to said main chamber to thereby subject the sealing liquid in said main chamber to the pressure developed in the high velocity body of sealing liquid in said auxiliary chamber; and separate passage means for returning sealing liquid from said main chamber to said auxiliary chamber.

4. In a liquid seal of the type comprising a cup secured to a rotating member and containing sealing liquid, and a baffle secured to a stationary member and extending downwardly around said rotating member and into said sealing liquid, and in which the sealing liquid is rotated with said cup and rotating member and tends to be displaced outwardly away from said rotating member by centrifugal force, the improvement comprising: walls on said cup in the upper portion thereof forming a pumping chamber containing a body of sealing liquid, said walls contacting and rotating the sealing liquid in said pumping chamber at high velocity to develop a pressure therein exceeding the pressure of the main body of sealing liquid in the portion of the cup below said pumping chamber, and means forming separate, radially spaced inlet and discharge passages between said pumping chamber and said main body of sealing liquid, whereby said relatively high pressure developed in said chamber is exerted on the main body of sealing liquid in opposition to the pressure developed by centrifugal force in said main body of sealing liquid, and outward displacement of the sealing liquid away from said rotating member is prevented.

5. A liquid seal for sealing the juncture of a rotating member and a stationary member, comprising: a cup secured to said rotating member and defining a chamber containing sealing liquid; a baffle secured to said stationary member and extending downwardly into said chamber and into said sealing liquid; said cup including an upper wall extending inwardly into relatively close proximity to said baffle and a second wall spaced below said upper wall and extending inwardly into relatively close proximity to said baffle, said second wall being disposed below the normal stationary level of said sealing liquid; the outer wall of said baffle being offset below said second wall radially outwardly of the inner periphery of said second wall; said cup including a third wall spaced below said second wall and extending inwardly into relatively closely spaced relation to said offset wall of said baffle; and means forming a passageway extending vertically through the outer portion of said third wall.

6. A liquid seal for sealing the juncture of a rotating member and a stationary member, comprising: a cup secured to said rotating member and forming therewith a receptacle containing sealing liquid; a baffle secured to said stationary member and extending downwardly around said rotating member and into said sealing liquid and dividing the surface thereof into a primary surface on the inner side of said baffle and a secondary surface on the outer side of said baffle, said primary surface tending to move downwardly during rotation of said sealing liquid with said rotating member and cup; and pumping means opposing said downward movement of said primary surface, comprising upper and lower ledges on said cup adjacent the upper end thereof and extending inwardly into close proximity to said baffle and defining a pumping chamber containing a body of sealing liquid, means forming a discharge passage from said chamber downwardly through said lower ledge, and walls on said baffle and said lower ledge forming a passage for upward flow of sealing liquid into said chamber, said last-named passage being spaced radially inwardly of said first-named passage and radially outwardly of the inner periphery of said upper ledge.

7. A liquid seal for sealing the juncture of a rotating shaft and a stationary member, comprising: a cup secured to said shaft to rotate therewith and defining with the shaft a receptacle containing sealing liquid; a baffle secured to said stationary member and extending downwardly into said receptacle and into the sealing liquid therein, said baffle including a section of relatively small outer diameter and a section therebelow of greater outer diameter than said first section and terminating at its upper end in an upwardly facing shoulder; said cup including upper and lower ribs extending radially inwardly into relatively closely spaced relation to the small and large diameter sections, respectively, of said baffle whereby said upper rib extends inwardly beyond said lower rib and overlies said shoulder; and means forming passageways for circulation of sealing liquid upwardly past the inner periphery of said lower rib and downwardly through the outer portion thereof, said upward circulation passageway being spaced radially outwardly of the inner periphery of said upper rib.

8. A liquid seal as set forth in claim 7, and including a projection on said baffle between said ribs and providing a downwardly facing shoulder overlying said upward circulation passageway for deflecting the upwardly flowing sealing liquid outwardly away from the inner periphery of said upper rib.

9. A liquid seal as set forth in claim 7, and including an inwardly extending projection on said cup providing an upwardly facing shoulder disposed beneath the path of downward circulation of sealing liquid for deflecting the latter inwardly toward said baffle.

10. A seal for sealing the juncture of a rotating shaft and a stationary member, comprising: a cup secured to said shaft and providing a chamber containing sealing liquid; a baffle secured to said stationary member and extending downwardly around said shaft and into said sealing liquid and dividing said chamber into inner and outer compartments; said sealing liquid rotating with said shaft and cup and tending to be displaced from said inner compartment into said outer compartment by centrifugal force; pumping means in said outer compartment providing continuous secondary circulation of sealing liquid in a closed path for developing pressure opposing the outward displacement of the sealing liquid; and walls on said cup and baffle providing a relatively narrow throttling passage between said closed circulation path and said inner compartment, whereby the sealing liquid in the latter is shielded from stray currents emanating from said secondary circulation but is subjected to the pressure developed thereby.

11. In a seal for sealing the juncture of a rotating shaft and a stationary member, the combination of: a cup secured to said shaft and providing a chamber containing sealing liquid; a baffle secured to said stationary member and extending downwardly around said shaft and into said sealing liquid, said baffle terminating in a lower edge spaced above the bottom of said chamber, and said baffle dividing said chamber into inner and outer compartments communicating with each other around the lower edge of the baffle; pumping mean in said outer compartment providing continuous secondary circulation of sealing liquid in a closed path which includes a downwardly flowing stream adjacent the wall of said cup and an upwardly flowing stream adjacent said baffle; walls on said cup and baffle providing a relatively narrow throttling passage between said closed circulation path and said inner compartment, whereby the sealing liquid in said inner compartment is protected from stray currents emanating from said secondary circulation while being subjected to the pressure developed thereby; and a projection on said cup providing an upwardly facing shoulder disposed beneath said downwardly flowing stream and deflecting the latter away from said throttling passage.

12. A liquid seal for sealing the juncture of a rotating shaft and a stationary member comprising: a cup secured to said shaft and defining therewith a receptacle containing a body of sealing liquid; a baffle secured to said stationary member and extending downwardly into said sealing liquid and dividing said receptacle into inner and outer compartments; said cup including a wall projecting into said outer compartment adjacent the upper end thereof into relatively close proximity to said baffle and defining with the latter a passageway for the flow of sealing liquid upwardly past the inner periphery of said wall; and means responsive to the presence of sealing liquid in that portion of said cup above said wall and to rotation of said shaft and cup for delivering sealing liquid from that portion of said cup above said wall into that portion of the cup below said wall.

13. Apparatus as described in claim 12, in which said means for delivering sealing liquid from the upper portion of said cup to the lower portion thereof includes a passageway offering less resistance to flow of sealing liquid therethrough than said first-mentioned passageway.

14. A liquid seal for sealing the juncture of a rotating shaft and a stationary member comprising: a cup secured to said shaft and defining therewith a receptacle containing a body of sealing liquid; a baffle secured to said stationary member and extending downwardly into said sealing liquid and dividing said receptacle into inner and outer compartments; said cup including a wall projecting into said outer compartment adjacent the upper end thereof into relatively close proximity to said baffle and defining with the latter a passageway for the flow of sealing liquid upwardly past the inner periphery of said wall; and means responsive to overflow of sealing liquid through said passageway from the lower portion to the upper portion of said cup for returning said sealing liquid from said upper portion to said lower portion at least as rapidly as it flows through said passageway, whereby retention of any substantially increased quantity of sealing liquid in said upper portion of said cup is precluded.

15. A seal for sealing the juncture of a rotating shaft and a stationary member, comprising: a cup secured to said shaft and providing a chamber containing sealing liquid; a baffle secured to said stationary member and extending downwardly around said shaft and into said sealing liquid and dividing said chamber into inner and outer compartments; said sealing liquid rotating with said shaft and cup and tending to be displaced from said inner compartment to said outer compartment by centrifugal force; pumping means in the upper portion of said outer compartment for developing pressure opposing the outward displacement of the sealing liquid; and walls defining a relatively narrow throttling passage between said pumping means and said inner compartment for shielding the sealing liquid in said inner compartment from stray secondary currents emanating from said pumping means.

ALADAR HOLLANDER.
VAINO A. HOOVER.
CHARLES H. NAZRO.